United States Patent [19]

Meyer

[11] 4,117,321

[45] Sep. 26, 1978

[54] ELECTRODE SYSTEM FOR MULTIPOLES AND ESPECIALLY FOR MULTIPOLE OR MONOPOLE MASS SPECTROMETERS

[75] Inventor: Wilhelm Meyer, Bremen, Germany

[73] Assignee: Varian MAT Gesellschaft mit beschrankter Haftung, Bremen, Germany

[21] Appl. No.: 799,391

[22] Filed: May 23, 1977

Related U.S. Application Data

[63] Continuation of Ser. No. 586,992, Jun. 16, 1975, abandoned.

[30] Foreign Application Priority Data

Jun. 18, 1974 [DE] Fed. Rep. of Germany ....... 2429214
Jul. 16, 1974 [DE] Fed. Rep. of Germany ....... 2434090

[51] Int. Cl.[2] ........................ B01D 59/44; H01J 39/34
[52] U.S. Cl. .................................... 250/292; 250/281
[58] Field of Search ............... 250/292, 290, 281, 282; 65/60 C

[56] References Cited

U.S. PATENT DOCUMENTS

| | | | |
|---|---|---|---|
| 2,939,952 | 6/1960 | Paul et al. | 250/292 |
| 3,105,899 | 10/1963 | Günther et al. | 250/292 |
| 3,143,647 | 8/1964 | Günther et al. | 250/292 |
| 3,280,326 | 10/1966 | Günter | 250/292 |
| 3,328,146 | 6/1967 | Hänlein | 65/60 C |
| 3,840,742 | 10/1974 | Ball | 250/292 |

*Primary Examiner*—Alfred E. Smith
*Assistant Examiner*—B. C. Anderson
*Attorney, Agent, or Firm*—Charles Hieken

[57] ABSTRACT

Pole rod electrodes especially for quadrupole mass spectrometers are seated in a pipe of thermally moldable material formed with a number of intersecting adjacent inside flat surfaces in precise relationship with the pole rods parallel to one another within a tolerance of a few micrometers arranged to insure a resolution within the range around the mass number 1000 so that it is possible to separate completely adjacent integral mass numbers, the rods being capable of removal.

20 Claims, 7 Drawing Figures

FIG. 3
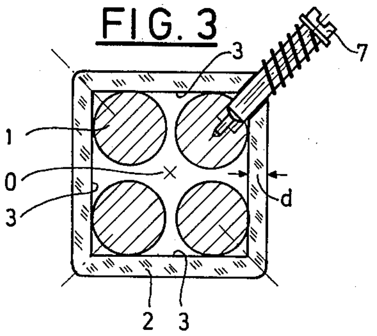
FIG. 4
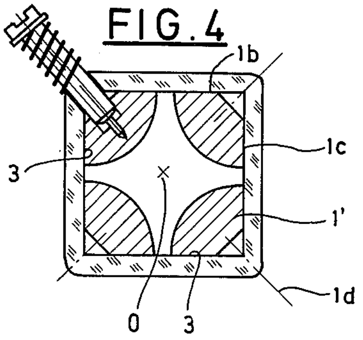
FIG. 5
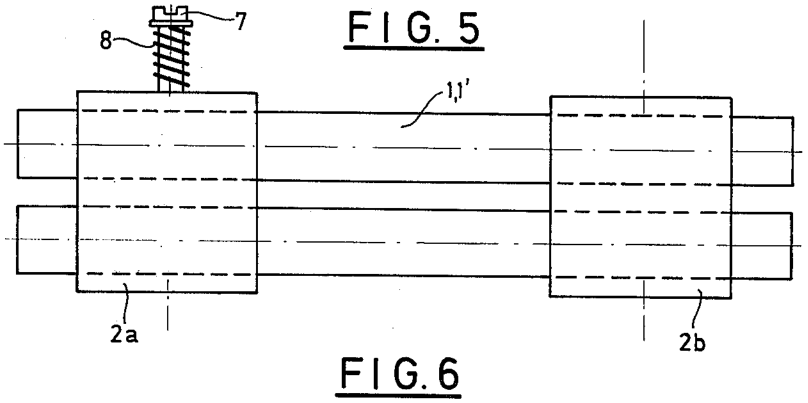
FIG. 6
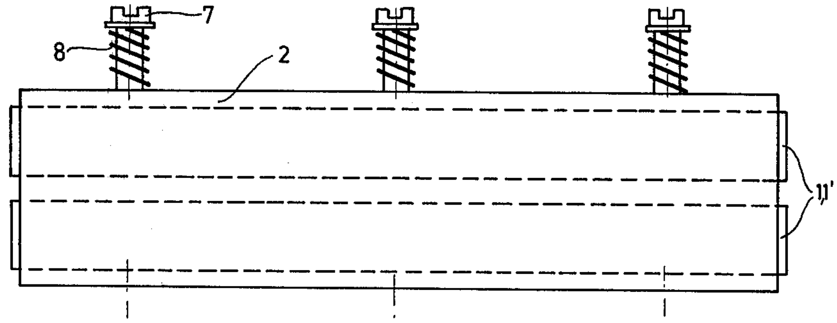
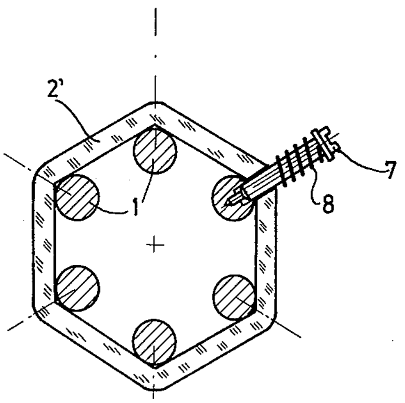
FIG. 7

ELECTRODE SYSTEM FOR MULTIPOLES AND ESPECIALLY FOR MULTIPOLE OR MONOPOLE MASS SPECTROMETERS

This is a continuation of application Ser. No. 586,992, filed June 16, 1975 abandoned.

FIELD OF THE INVENTION

This invention relates to an electrode system for multipoles and especially for multipole or monopole mass spectrometers and furthermore relates to methods for producing such electrode systems.

DESCRIPTION OF THE PRIOR ART

The quality of an electrode system for mass spectrometer especially quadrupole and monopole mass spectrometer depends critically on the exact adjustment of the electrode or pole rods as has been proved theoretically and by experiment, compare US-PS No. 3.767.914 and W. Paul, H. P. Reinhard, U. v. Zahn in Zeitschrift fur Physik Bd. 152, S. 143, 1958. A parallelism of the electrode rods with a tolerance of only few micrometers is necessary to ensure a resolution within the range around the mass number 1000 so that it is possible to separate completely adjacent integral mass numbers. According to the theory of mass filters the electrodes should have hyperbolic electrode surfaces. The production of such electrode systems with hyperbolic electrode surfaces, however, hitherto was very complicated and unsatisfying. Therefore, in practice electrode rods in the form of circular cylinders have been preferred which are adjusted and fixed in two small annular ceramic supports (Pat. No. 1.263.762 Great Britain). The production and adjustment of ceramic supports with the necessary accuracy of its supporting surfaces, however, is also still affected by grave technical difficulties and uncertainties. Moreover, the support of the electrode rods by two small annular supports complicates the twist-free adjustment of the electrode rods and often may cause trouble by distortion during the heating at approximately 250° C of the system which is necessary in vacuum processing.

In order to avoid the difficulties of adjustment of separate electrode rods mass spectrometers have been developed in which four electrode rods and their holding device are formed as an integrated body by that a glass tube at its inside is provided with rod-like portions protruding inwardly. These protruding inner surfaces are metallized so that they are available as analyzer electrodes (U.S. Pat. No. 3,328,146). Now, it is indeed possible to manufacture a glass tube with such protruding inner surfaces of an accuracy sufficient per se to fulfill the above requirements, nevertheless this high accuracy cannot be taken advantage of on account of the unavoidable inaccuracies of the plating procedure which necessarily must be applied in connection with electrode rods of insulating material.

PROBLEM

It is an object of my invention to provide a construction and method for production of an electrode system especially for quadrupole mass filters suitable to ensure accuracies high enough to fulfill the aforementioned requirements.

SUMMARY OF THE INVENTION

In the solution of this problem, the invention proceeds from the consideration that on the one hand a high accuracy and stability of the individual electrode surfaces in the best possible manner may be achieved by electrode rods made of metal whereas on the other hand a high accuracy of the holding device in the best possible manner may be achieved by the application of a tube-like holding body manufactured by impression of a core mold.

The invention thus broadly consists in that one or more parallel pole rods preferably of a conductive material are supported by supporting surfaces at the inside of a tubular holding device of glass or other softenable insulating material manufactured by impression of a core mold. This construction enables a high total accuracy and stability because all elements of the system which are responsible for the accuracy and stability namely the supporting surfaces of the holding device and the electrode rods contacting another as well as the electrical active surfaces of the electrode rods can be manufactured by technologies suitable to guarantee accuracies as are necessary to fulfill the aforementioned requirements.

The impression of said core mold may be carried out by adequate methods appropriate to the properties of the insulating material which is used to produce the holding device. A holding device of glass preferably is manufactured by an impression method which is generally known by the name KPG-method (page 66 of the catalog No. 66 "Glass for Laboratories" of the company Schott, Mainz, West-Germany). According to this method the core mold is inserted into a glass tube of larger diameter and the softened tube material is enforced towards the core mold by producing a pressure gradient from outside to inside of the tube preferably by evacuation of the tube.

Ceramic holding devices preferably are manufactured according to the known principle of pressure casting namely by insertion of the core mold into a mold and by insertion under pressure of liquefied material into the free space between the core mold and the inwall of the mold.

An electrode system according to the invention is characterized not only by high accuracy but also by relative simple manufacture and low costs.

The holding device may consist of two or more coaxial tubular members the axial dimension of two members being each not smaller than the apotherm (in-circle) of the holding device. However, the aforementioned methods of production give the favorable possibility to ensure an exceptional high precision by that the holding device is made as one tubular piece the length of which corresponds essentially to the length of the electrode rods.

The holding device may be provided with two (preferably plane) supporting surfaces at an angle less than 180° for each electrode rod. Such supporting surfaces will contact circular cylindrical electrode rods along generatrixes of the rod superficies, but they would also be suitable to support electrode rods provided with hyperbolical pole surfaces at their sides facing each other and with preferably plane rear supporting surfaces arranged at the same angle as are arranged the corresponding supporting surfaces of the holding device, thus aligning the plane of symmetry of the pole surface to the center line of the electrode system.

The supporting surfaces of the holding device which are provided for adjacent electrode rods preferably are situated within common planes, respectively. Thereby the holding device of a quadrupole system will get a simple quadratic profile.

BRIEF DESCRIPTION OF THE DRAWINGS

The invention will now be further described, by way of example only, with reference to the accompanying drawings of which:

FIG. 3 is a square section through an electrode system of a quadrupole mass spectrometer with circular cylindrical electrode rods, FIG. 4 is a square section through an electrode system of a quadrupole mass spectrometer with hyperbolical pole surfaces of the electrode rods, FIG. 5 is a side view of the electrode system of FIG. 3 or 4, with a holding device consisting of two coaxial elements, FIG. 6 is a side view of the electrode system of FIG. 3 or 4, with a holding device consisting of one piece, and FIG. 7 a square section through an electrode system of a hexapole system according to the invention.

DETAILED DESCRIPTION OF THE INVENTION

The quadrupole systems as are shown in FIG. 3 to 6 are used in mass spectrometers and consist generally of four equal pole rods 1, 1' which are arranged parallel to one another at the corners of a square. The pole rods 1, 1' are rigid rods the supporting surfaces and pole surfaces of which may be profiled by machining.

The holding device of the pole rods or electrode rods 1 consists of a tube 2 with inside supporting surfaces 3 to support and adjust said electrode rods 1.

In order to ensure the required dimensional accuracy and stability all over the length of the holding device 2 the production of same is effected by impression at which softened or liquefied insulating material is brought in contact to a core mold K. By maintaining the contact between the insulating material and the core mold up to the solidification of the insulating material an accuracy of the inside of the tubular holding device 2 just equal to the accuracy of the outside of the core mold K is attained.

As a result of this a constant accuracy of only few micrometers all over the length of the holding device may be attained without high expenditure.

Figure 1:
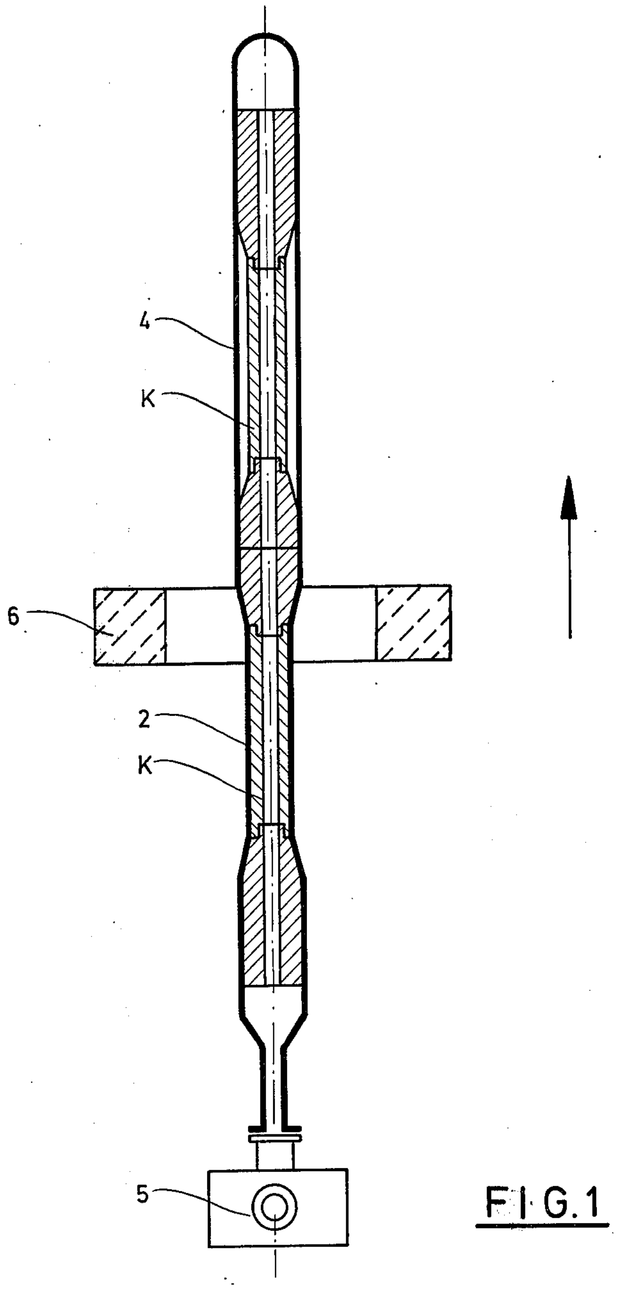
FIG. 1 is a schematic view explanatory for illustration of the production of a tubular holding device according to the KPG-method.

FIG. 1 illustrates the impression of the core mold K by the known KPG-method. According to this principle the core mold K is inserted into a tube 4 of softenable insulating material e.g. glass of larger diameter. Subsequently a pressure gradient from outside to inside of the tube 4 is applied e.g. by evacuation with the aid of a vacuum pump 5. Then the material of tube 4 is softened by heating with the aid of an axially shiftable kiln 6 so that the softened glass is pressed against the core mold K. After having shifted the kiln over the whole length of the core mold K and following the solidification of the insulating material the core mold K can be axially removed from the tube 4 opened at one of its ends.

Figure 2:
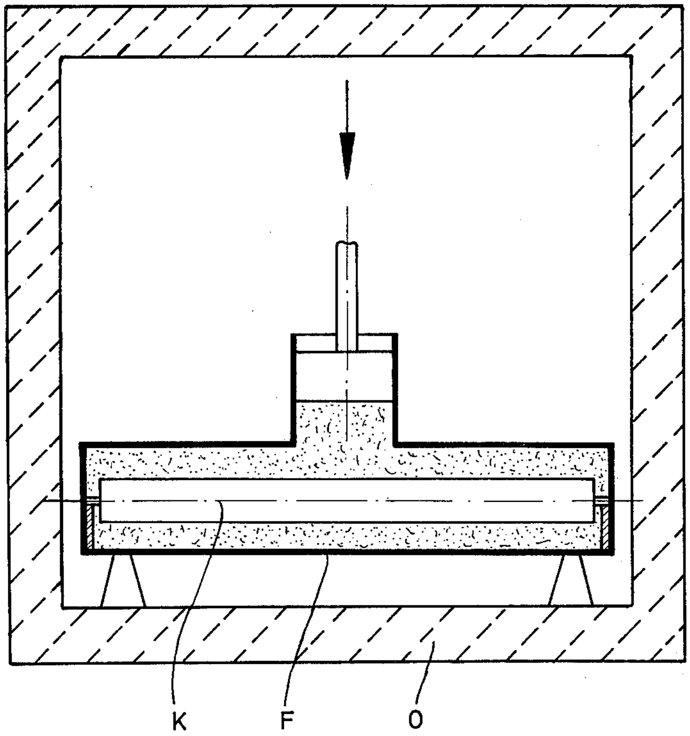
FIG. 2 is a schematic view explanatory for illustration of the production of a tubular holding device according to the principle of pressure casting.

FIG. 2 illustrates the impression of the core mold K by the known method of pressure casting. According to this principle the core mold K is inserted into a casting mold preferably a die-casting die F and liquefied insulating material is pressed into the free space between the core mold K and the inwall of mold F, e.g. by a piston. The closely contact of the insulating material is maintained until solidification of the insulating material. Following the higher shrinkage of the core mold with its higher coefficient of expansion after further cooling the core mold is removed from the tubular holding body.

The impression by pressure casting is especially suitable in connection with holding devices made of ceramic material. The pole rods 1 may be fixed within the housing device 2 by screws 7 by which they are brought in the correct contact to the supporting surfaces 3 at the inside of the tubular holding device.

FIG. 4 illustrates a quadrupole system with hyperbolical pole surfaces. The respective electrode rods 1' are provided with leading and supporting surfaces **1*b*, 1*c* at their back sides, opposite the hyperbolical pole surfaces, which contact the supporting surfaces 3 thereby aligning the plane of symmetry 1*d* of the pole surface to the center line 0** of the quadrupole system.

Corresponding to the circumstances and requirements of accuracy the holding device may consist of several portions **2*a*, 2*b*, as is shown in FIG. 5 or may consist of one piece only as is shown in FIG. 6**. In any case the axial length of each portion should be not smaller than is the apothem of the holding device.

The invention is suitable not only in connection with quadrupole systems but may also be used for monopole systems and systems with more than four poles; FIG. 7 is showing a square section through a hexapole system with holding tubes 2' according to the invention, provided with circular cylindrical electrode rods 1.

The impression of the core mold may be made also by methods other than the KPG-method or pressure casting e.g. by forming the pole surfaces by the heated core mold.

| LIST OF REFERENCES | |
|---|---|
| 1,1' | rods, electrode rods, deflector electrodes of the analyzer system of a mass spectrometer |
| 1a | pole surfaces |
| 1b,1c | guide and supporting surfaces |
| 1d | plane of symmetry |
| 2,2' | holding device, annular member of an insulating material, tube of electrically poorly conducting and softenable material |
| 2a,b | divided holding device |
| 3 | supporting surfaces |
| 4 | glass tube |
| 5 | vacuum pump |
| 6 | annular kiln |
| 7 | screws |
| 8 | springs |
| F | casting mold, die-casting die |
| K | core mold |
| O | center line |

Having discussed the invention, what is claimed is:

1. Electrode apparatus for multipoles, including monopoles, especially for quadrupole mass spectrometers, with one or more pole rods, which have electrically conducting pole surfaces, and with a hollow section serving as the seating for the pole rods, which are capable of being removed, comprising, a pipe formed with a plurality of intersecting adjacent inside flat surfaces comprising said hollow section for seating each of said pole rods in contact with intersecting adjacent inside flat surfaces of said pipe in a predetermined precise relationship with said pole rods parallel to one another within a tolerance of a few micrometers, and said pole rods being fitted directly in contact with intersecting adjacent inside flat surfaces of said pipe whereby a line on the surface of each of said pole rods a predetermined distance from said inner surface is precisely parallel to the axis of said pipe to insure a resolution within the range around the mass number 1000 so that it is possible to separate completely adjacent integral mass numbers.

2. Electrode apparatus in accordance with claim 1 wherein said inner surface comprises two adjacent bearing surfaces at an angle to each other for mating engagement with each pole rod.

3. Electrode apparatus in accordance with claim 2 wherein each of said bearing surfaces is substantially flat.

4. Electrode apparatus in accordance with claim 2 wherein each pole rod resides in a corner of said pipe formed by adjacent bearing surfaces.

5. Electrode apparatus in accordance with claim 4 wherein each of said pole rods is circularly cylindrical.

6. Electrode apparatus in accordance with claim 4 wherein each of said pole rods is formed with hyperbolic surfaces facing the pipe axis and guiding and supporting surfaces adjacent to a respective one of said bearing surfaces.

7. Electrode apparatus in accordance with claim 6 wherein the angle between the guiding and supporting surfaces of each rod is substantially the same as the angle between the adjacent bearing surfaces for mating engagement therewith.

8. Electrode apparatus in accordance with claim 1 wherein the cross section of said pipe is a regular polygon.

9. Electrode apparatus in accordance with claim 8 wherein said cross section is square and includes a pole rod in each corner.

10. Electrode apparatus in accordance with claim 8 wherein said cross section is hexagonal and each corner includes a pole rod.

11. Electrode apparatus in accordance with claim 1 wherein said pipe of thermally moldable material formed with a plurality of intersecting adjacent inside flat surfaces is manufactured in a molding process in a mold core of high precision.

12. Electrode apparatus in accordance with claim 11 wherein said inner surface comprises two adjacent bearing surfaces at an angle to each other for mating engagement with each pole rod.

13. Electrode apparatus in accordance with claim 12 wherein each of said bearing surfaces is substantially flat.

14. Electrode apparatus in accordance with claim 12 wherein each pole rod resides in a corner of said pipe formed by adjacent bearing surfaces.

15. Electrode apparatus in accordance with claim 14 wherein each of said pole rods is circularly cylindrical.

16. Electrode apparatus in accordance with claim 14 wherein each of said pole rods is formed with hyperbolic surfaces facing the pipe axis and guiding and supporting surfaces adjacent to a respective one of said bearing surfaces.

17. Electrode apparatus in accordance with claim 16 wherein the angle between the guiding and supporting surfaces of each rod is substantially the same as the angle between the adjacent bearing surfaces for mating engagement therewith.

18. Electrode apparatus in accordance with claim 11 wherein the cross section of said pipe is a regular polygon.

19. Electrode apparatus in accordance with claim 18 wherein said cross section is square and includes a pole rod in each corner.

20. Electrode apparatus in accordance with claim 18 wherein said cross section is hexagonal and each corner includes a pole rod.

* * * * *